UNITED STATES PATENT OFFICE 2,324,278

RUBBER HYDROCHLORIDE COMPOSITION

James P. Chittum and George E. Hulse, Passaic, N. J., assignors to United States Rubber Company, New York, N. Y., a corporation of New Jersey No Drawing. Application January 24, 1940, Serial No. 315,328

10 Claims. (Cl. 260—735)

This invention relates to new compositions of matter comprising rubber-hydrogen chloride reaction products, particularly to transparent films and lacquers.

An object of the invention is to provide a new class of photochemical inhibitors for rubber hydrochloride films, particularly for transparent rubber hydrochloride films. Other objects will be apparent from the following description.

Hitherto the effectiveness of chemical stabilizers of rubber hydrochloride has been limited by their lack of solubility in the film, their volatility from the film, or discoloration of the film on aging.

The present invention provides chemicals which are compatible with rubber hydrochloride and which enable the production of films which are clear and free from haze or color and which do not discolor during light aging. The chemicals furthermore do not impart any odor to the films, which makes their use as wrappers for food materials desirable. Compared with other chemicals previously used for the purpose the films of the present invention retain their usefulness longer because of better retention of strength and flexibility.

Broadly the invention comprises the use, as chemical stabilizers in rubber hydrochloride compositions, of C-alkyl substituted piperazines. Either the true base or its hydrates may be utilized. The materials subscribe to the general formula

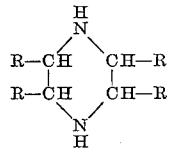

where R represents hydrogen or an alkyl group.

Examples of such chemicals included within the scope of the invention are: 2-methyl piperazine, 2,5-dimethyl piperazine, 2,3,5-trimethyl piperazine, 2-methyl-5-ethyl piperazine, 2,5-dimethyl-3,6-diethyl piperazine, 2,3,5,6-tetramethyl piperazine, 2,3,5,6-tetraethyl piperazine, etc.

The rubber hydrochloride may be produced by passing hydrogen chloride gas into a rubber cement, as disclosed by Bradley and McGavack (U. S. Patent 1,519,659), or by reacting rubber with hydrogen chloride gas at a low temperature (disclosed by Gebauer-Fullnegg and Moffet U. S. Patent 1,980,396) or by any other method.

If the rubber hydrochloride is sufficiently soluble it can be made into a cement to which the alkyl substituted piperazine is added in such amount as has been determined by experiment to give effective protection against light aging. The cement may then be cast into film or used as a lacquer.

Some products of rubber and hydrogen chloride are not sufficiently soluble to form spreading cements. The alkyl substituted piperazine may be incorporated into such rubber hydrochlorides by milling on a rubber mill. Films can then be produced by calendering the mixture.

Rubber hydrochloride films having incorporated therein a C-alkyl substituted piperazine in accordance with the invention have been found to be more resistant to deterioration upon exposure to light than films containing no added stabilizer.

The following table illustrates the improvements in aging obtained by incorporating 2% by weight of a C-alkyl substituted piperazine in transparent films of rubber hydrochloride:

| Stabilizer | Fade-Ometer | Sunlamp | Diffused light |
|---|---|---|---|
| | Hours | Hours | Days |
| None | 40 | 120 | 60 |
| 2,3,5,6-tetramethyl piperazine | 80 | 240 | 95 |

The films (thickness .001 inch) were respectively aged until brittle in a Fade-Ometer at 110° F., under a General Electric Co. sunlamp, and in daylight behind a window having a southern exposure The alkyl substituted piperazines may be prepared in known manner—for example, by the following series of reactions: An aliphatic ketone, such as acetone or methyl ethyl ketone, is treated with nitrous acid at room temperature; the resulting isonitroso compound is reduced with sodium hydrosulfite to the corresponding alpha-amino-ketone, two molecules of which are then condensed by warming and aerating a solution of the amino-ketone to form a substituted pyrazine; this in turn may then be reduced catalytically in dioxan solution by hydrogen at a pressure of 4000 lbs./sq. in. at 285° C. "Raney nickel" is a suitable catalyst. (Journal für praktische Chemie (2), 47, 494, 508; Journal für praktische Chemie (2), 55, 74; Zeitschrift für Physiologische Chemie, 34, 350.)

The new stabilizers may be used with rubber hydrochlorides having any hydrogen chloride content in the range commercially available, and especially with rubber hydrochloride having a hydrogen chloride content of over 30% and being in the form of transparent film suitable for photographic film or for wrapping purposes.

The rubber hydrochloride stabilized by the chemicals disclosed herein may be used in various forms and for the various purposes for which rubber hydrochloride compositions are generally known to be used.

Having thus described our invention, what we claim and desire to protect by Letters Patent is:

1. A pellicle comprising a rubber hydrochloride composition containing a C-alkyl substituted piperazine, in which the alkyl radical contains from 1 to 2 carbon atoms, and in a small amount sufficient to retard the photochemical disintegration of the rubber hydrochloride.

2. A transparent pellicle comprising a rubber hydrochloride composition containing a C-alkyl substituted piperazine, in which the alkyl radical contains from 1 to 2 carbon atoms, and in a small amount sufficient to retard the photochemical disintegration of the rubber hydrochloride.

3. A rubber hydrochloride composition containing a 2,5 dialkyl piperazine, in which the alkyl radicals contain from 1 to 2 carbon atoms, and in a small amount sufficient to retard the photochemical disintegration of the rubber hydrochloride.

4. A rubber hydrochloride composition containing 2,5-dimethyl piperazine in a small amount sufficient to retard the photochemical disintegration of the rubber hydrochloride.

5. A rubber hydrochloride composition containing a 2,5-dimethyl-3,6-diethyl piperazine in a small amount sufficient to retard the photochemical disintegration of the rubber hydrochloride.

6. A rubber hydrochloride composition containing a 2,3,5,6-tetramethyl piperazine in a small amount sufficient to retard the photochemical disintegration of the rubber hydrochloride.

7. A product composed at least in part of rubber hydrochloride stabilized with a C-alkyl substituted piperazine, in which the alkyl radical contains from 1 to 2 carbon atoms, and in a small amount sufficient to retard the photochemical disintegration of the rubber hydrochloride.

8. A rubber hydrochloride composition containing a 2,3,5,6-tetra-alkyl piperazine in which the alkyl radicals contain from 1 to 2 carbon atoms, and in a small amount sufficient to retard the photochemical disintegration of the rubber hydrochloride.

9. A pellicle comprising a rubber hydrochloride composition containing a 2,3,5,6-tetra-alkyl piperazine in which the alkyl radicals contain from 1 to 2 carbon atoms, and in a small amount sufficient to retard the photochemical disintegration of the rubber hydrochloride.

10. A rubber hydrochloride composition containing a small amount of a C-alkyl substituted piperazine in which the alkyl radical contains from 1 to 2 carbon atoms, which small amount is sufficient to retard the photochemical disintegration of the rubber hydrochloride.

JAMES P. CHITTUM.
GEORGE E. HULSE.